(12) United States Patent
Pirzada et al.

(10) Patent No.: US 7,620,716 B2
(45) Date of Patent: Nov. 17, 2009

(54) SYSTEM AND METHOD TO PREDICT THE PERFORMANCE OF STREAMING MEDIA OVER WIRELESS LINKS

(75) Inventors: Fahd Pirzada, Austin, TX (US); Pratik M. Mehta, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 734 days.

(21) Appl. No.: 11/344,510

(22) Filed: Jan. 31, 2006

(65) Prior Publication Data

US 2007/0180106 A1   Aug. 2, 2007

(51) Int. Cl.
*G06F 15/173* (2006.01)

(52) U.S. Cl. .................... 709/224; 709/231; 709/203; 709/247

(58) Field of Classification Search ......... 709/223–224, 709/231, 203, 217, 247
See application file for complete search history.

(56) References Cited

U.S. PATENT DOCUMENTS

| | | | |
|---|---|---|---|
| 7,085,576 B2 * | 8/2006 | Ranganathan ................ 709/231 |
| 2003/0014233 A1 | 1/2003 | Rappaport et al. ............ 703/13 |
| 2003/0229478 A1 | 12/2003 | Rappaport et al. ............ 703/13 |
| 2004/0039836 A1 * | 2/2004 | Wee et al. .................... 709/231 |
| 2004/0143428 A1 | 7/2004 | Rappaport et al. ............ 703/22 |
| 2004/0203693 A1 | 10/2004 | Mehta et al. ................. 455/419 |
| 2004/0229623 A1 | 11/2004 | Rappaport et al. ........... 455/446 |
| 2004/0259555 A1 | 12/2004 | Rappaport et al. .......... 455/446 |
| 2005/0012532 A1 | 1/2005 | Mehta et al. ................. 327/155 |
| 2005/0043933 A1 | 2/2005 | Rappaport et al. ............. 703/1 |
| 2005/0160287 A1 | 7/2005 | Mehta et al. ................. 713/200 |
| 2005/0182847 A1 | 8/2005 | Pirzada et al. ............... 709/233 |
| 2005/0210299 A1 | 9/2005 | Mehta et al. ................. 713/300 |
| 2005/0226356 A1 | 10/2005 | Pirzada et al. .............. 375/350 |
| 2005/0267928 A1 * | 12/2005 | Anderson et al. ........... 709/200 |
| 2006/0025171 A1 | 2/2006 | Ly et al. .................... 455/553.1 |
| 2006/0039333 A1 | 2/2006 | Pirzada et al. ............... 370/338 |
| 2006/0073847 A1 | 4/2006 | Pirzada et al. ............ 455/556.2 |
| 2006/0084411 A1 | 4/2006 | Lo et al. ..................... 455/411 |
| 2006/0136578 A1 * | 6/2006 | Covell et al. ................ 709/223 |
| 2006/0143496 A1 * | 6/2006 | Silverman ..................... 714/4 |
| 2006/0188014 A1 * | 8/2006 | Civanlar et al. ......... 375/240.03 |

OTHER PUBLICATIONS

Li et al. "Weather Forecasting—Predicting Performance for Streaming Video over Wireless LANs", NOSSDAV '05, Jun. 13-14, 2005, ACM.*

* cited by examiner

*Primary Examiner*—Philip B Tran
(74) *Attorney, Agent, or Firm*—Hamilton & Terrile, LLP; Gary W. Hamilton (57) ABSTRACT

An improved system and method for predicting streaming media performance through the use of real-time wireless network performance measurements and statistical analysis, combined with a generalized methodology for comparing digital media quality before and after transmission. Network performance parameters of a benchmark media stream, such as throughput and signal strength, are measured for predetermined wireless network ranges and correlated to the introduction of various artifacts such as but not limited to, blurring, blockiness, and jerkiness, affecting streaming video quality. In various embodiments of the invention, network throughput and signal strength measurements of a received media stream can be processed by an algorithm and correlated to previously collected benchmark measurements to predict the resulting audio and video quality as experienced by a user.

20 Claims, 5 Drawing Sheets

SYSTEM AND METHOD TO PREDICT THE PERFORMANCE OF STREAMING MEDIA OVER WIRELESS LINKS

BACKGROUND OF THE INVENTION

1. Field of the Invention

The present invention relates in general to the field of information handling systems and more specifically, to predicting the quality of streaming media over wireless networks.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems configured as portable units have grown in popularity among users over the past several years. These systems generally integrate in a single housing a display, internal power source and processing components, such as the CPU and hard disk drive, so that a user can carry the portable system from place to place while the system is operating. As processing components have decreased in size and increased in performance, portable information handling systems are often able to pack processing capabilities into a relatively small housing that are comparable to the capabilities available from desktop systems.

It is becoming common for portable systems to comprise communications hardware and software that allows connectivity to wireless data networks, such as those based on variants of the 802.11 protocol, sometimes referred to as "Wi-Fi." These wireless data networks are gaining ubiquity in public venues such as coffee shops, secured Wireless Local Area Networks (WLANs) as subsets of corporate networks, and private homes for wirelessly connecting desktop and media PCs, portable devices such as laptops and Personal Digital Assistants (PDAs), Digital Media Appliances (DMAs) such as video projectors and other devices to each other and to the Internet.

Advances in wireless network performance have enabled the streaming of high quality audio/video content, typically through the use of packet switched or asymmetric transmission methods understood by those of skill in the art. The digitized content stream, which is generally compressed, can be received and rendered by a media player application on a computer but is typically not downloaded and stored, hence the term "streaming." An advantage of streaming media is it allows users to immediately view or listen to digitized content as it is being transmitted instead of waiting for an entire file to download. To offset the possibility of network transmission delays, a few seconds of data is typically sent ahead, buffered to temporary storage, and then deleted once viewing is complete. Streaming media servers can also provide audio/video content in a variety of streaming formats, such as RealMedia, QuickTime and Windows Media, allowing media player clients implementing different formats to receive and play the same content.

Streaming media can be transmitted and received in a variety of venues, including public (e.g., a coffee shop providing wireless access to the Internet), corporate (e.g., a secured wireless LAN implemented as part of a corporate network), or private (e.g., servers and portable devices wirelessly linked to each other and/or the Internet). For example, a consumer could view a live news broadcast on a wirelessly-enabled laptop computer or personal digital assistant (PDA) while having breakfast in a coffee shop. As another example, a media center PC in a home receives a live, high definition television (HDTV) feed through a wireline broadband connection, and then encodes the content for relay over a wireless network (e.g., 802.11) to a remote or portable device (e.g., laptop computer, remote TV, projector) which then decodes the content for viewing. It will be apparent to those of skill in the art that many such scenarios are possible and the examples given are not meant to be all-inclusive.

However, media streaming poses stringent requirements for network bandwidth, latency and packet loss, all of which can be adversely affected by a variety of factors in a wireless environment and can contribute to an unsatisfactory user experience. Currently, wireless network performance is measured in terms of throughput and range, with the assumption that if a throughput 'x' at a certain range is achieved, then video content that is encoded at a bit rate lower than 'x' can be streamed and viewed at that range. In practice, this assumption may prove inaccurate as throughput measurements are generally an average of the actual transfer rate over a predetermined time interval, yet the effective throughput rate can drop to levels below such an average during the same time interval. Since streaming media packets containing compressed content are not retransmitted, these drops in effective data transfer rate can adversely affect the quality of the content delivered to the user and even minor losses can result in video artifacts such as jitter, blockiness, dropped frames, and loss of audio synchronization.

Current tools and mechanisms to measure network performance, such as Chariot, produced by NetIQ, or Netperf, a collaborative effort of the FreeBSD network performance project, use various scripts to emulate streaming media applications. While such tools can be useful for determining anticipated network performance when passing typical streams of digitized media, they fail to provide insight into the quality of the delivered audio/video media stream as perceived by the user. Likewise, currently available video performance evaluation methods are not well suited for use in compressed video comparisons as they only compare uncompressed videos at the source and the client, nor do they address wireless network performance factors. Furthermore, current compressed video performance measurement tools, such as produced by industry consortiums such as the Video Quality Experts Group (VQEG) and commercial vendors such as Genista are similarly not suitable because the methods they use are specific to certain coding schemes and cannot be generalized. Current cellular networks have optimizations for voice communications and next generation cellular networks are beginning to target network optimizations for low bitrate video applications, but similar optimizations for wireless data networks (e.g., 802.11, etc.) are not available.

However, there are mechanisms in place to gather standardized statistics for network performance, such as 802.11k, which can provide client application feedback to WLAN access points and switches. Some of the network measurements that 802.11k defines include radio frequency (RF) channel knowledge and a series of measurement requests and reports that detail Layer 1 and Layer 2 client statistics. While access points or WLAN switches generally issue requests to the client to report data, clients can also issue requests for network performance data to facilitate client roaming decisions. While useful for measuring wireless network performance, these statistics and reports are not suitable for measuring the performance of streaming media applications or predicting the quality of the user experience.

Currently, there is no known system or method for a user to know in advance whether their system can support streaming media in a predetermined wireless environment, and if it can be supported, at what level of quality. In addition, streaming media client applications have no way of performing wireless network performance measurements in real-time to determine and indicate to a user the degree to which streaming media applications can be supported. Furthermore, wireless site surveyors are unable to gauge during planning and implementation whether streaming media applications can be adequately supported to meet user expectations. In view of the foregoing, a system and method is needed for testing the anticipated performance of streaming media applications within a predetermined wireless network environment.

SUMMARY OF THE INVENTION

In accordance with the present invention, a system and method is disclosed for predicting streaming media performance over a wireless network, through the use of real-time network performance measurements and statistical analysis combined with a generalized methodology for comparing digital media quality before and after transmission. In general, the method of the present invention allows the correlation of the streaming media user experience to network performance parameters such as throughput and signal strength.

In various embodiments of the invention, performance parameters are measured for any predetermined wireless network range, in addition to the resulting audio and video quality of a benchmark media stream. The relevant performance measurements that are used by the system of the present invention relate to various layers of a network communications stack as understood by those of skill in the art and include, but are not limited to, Over-The-Air (OTA) Interface (e.g., background traffic, aggregate Basic Service Set (BSS) throughput, etc.), Media Access Control/Physical (MAC/PHY) (e.g., forwarding rate, signal strength, signal to noise ratio (SNR), contention widow size, packet errors, etc.), Protocol (e.g., Transmission Control Protocol (TCP) throughput, TCP re-transmissions, User Datagram Protocol (UDP) lost packets, etc.), and Application (e.g., data transfer rate, latency, packet loss).

These network performance parameters are correlated to the resulting audio and video quality of the benchmark video stream to determine the threshold values providing the best available streaming media throughput. The threshold values can then be entered into an algorithm, described in greater detail below, to generate a numeric value that can serve as a "video quality score." The resulting benchmark video stream associated with a respective video quality score is then visually compared to the same benchmark video stream in uncompressed form to assess their respective quality and validate that the video quality score corresponds to the user's viewing experience. This correlation provides the ability to measure wireless network performance at a predetermined range and then predict the corresponding video performance characteristics.

These measurement correlations can be established for predetermined pairs of wireless network environments and streaming media clients and then incorporated into a database that can be distributed or implemented into products, either as firmware, software, or on-line. In addition, wireless network analyses performed in this manner could provide generalized streaming media performance guidance for a predetermined access point communicating to a generic wireless client.

Furthermore, various methods of the present invention can be implemented on wireless access points, which would maintain a correlation database that could provide streaming media performance predictions for predetermined streaming media clients. For example, when a streaming media client is searching for a signal in an indoor wireless network environment, the wireless access point could query the client to determine its identity and then search its database to see if the client is listed. If it is, the correlation database could specify streaming media performance limitations to the client, based on pre-set thresholds for signal strength or other network performance parameters.

Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system Wireless Network Quality Monitor predicts streaming media performance through the use of real-time network performance measurements and statistical analysis combined with a generalized methodology for comparing digital media quality before and after transmission.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
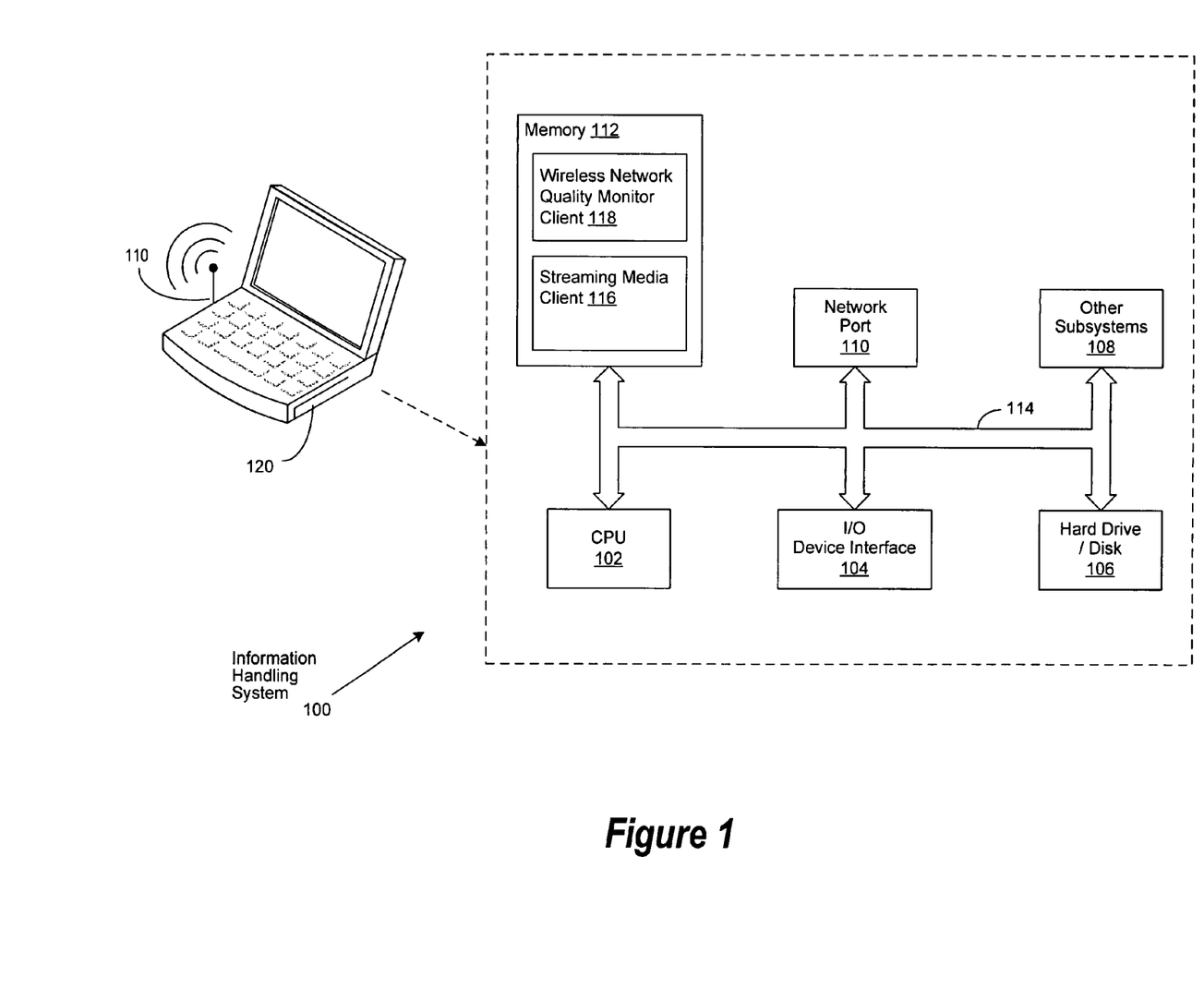
FIG. 1 is a generalized illustration of an information handling system that can be used to implement the method and apparatus of the present invention.

Referring now to FIG. 1, a block diagram depicts an information handling system 100 configured as a portable information processing system having a plurality of processing components, including wireless network port 110, disposed in a housing 120. In various embodiments of the invention, the streaming video performance of a predetermined wireless network environment is measured by network performance parameters such as throughput and signal strength, as communicated through wireless network port 110 to predict the quality of a user's viewing experience.

The functional components of the information handling system include a processor (e.g., central processor unit or "CPU") 102, input/output (I/O) device interface 104, such as a display, a keyboard, a mouse, and associated controllers, a hard drive or disk storage 106, various other subsystems 108, network port 110, such as a wireless data network (e.g., 802.11, etc.) subsystem, and system memory 112. Data is transferred between the various system components via various data buses illustrated generally by bus 114. Memory 112 comprises streaming media client 112, which renders one or more streams of compressed digital content, and wireless network quality monitor 118 as described in more detail herein.

Figure 2:
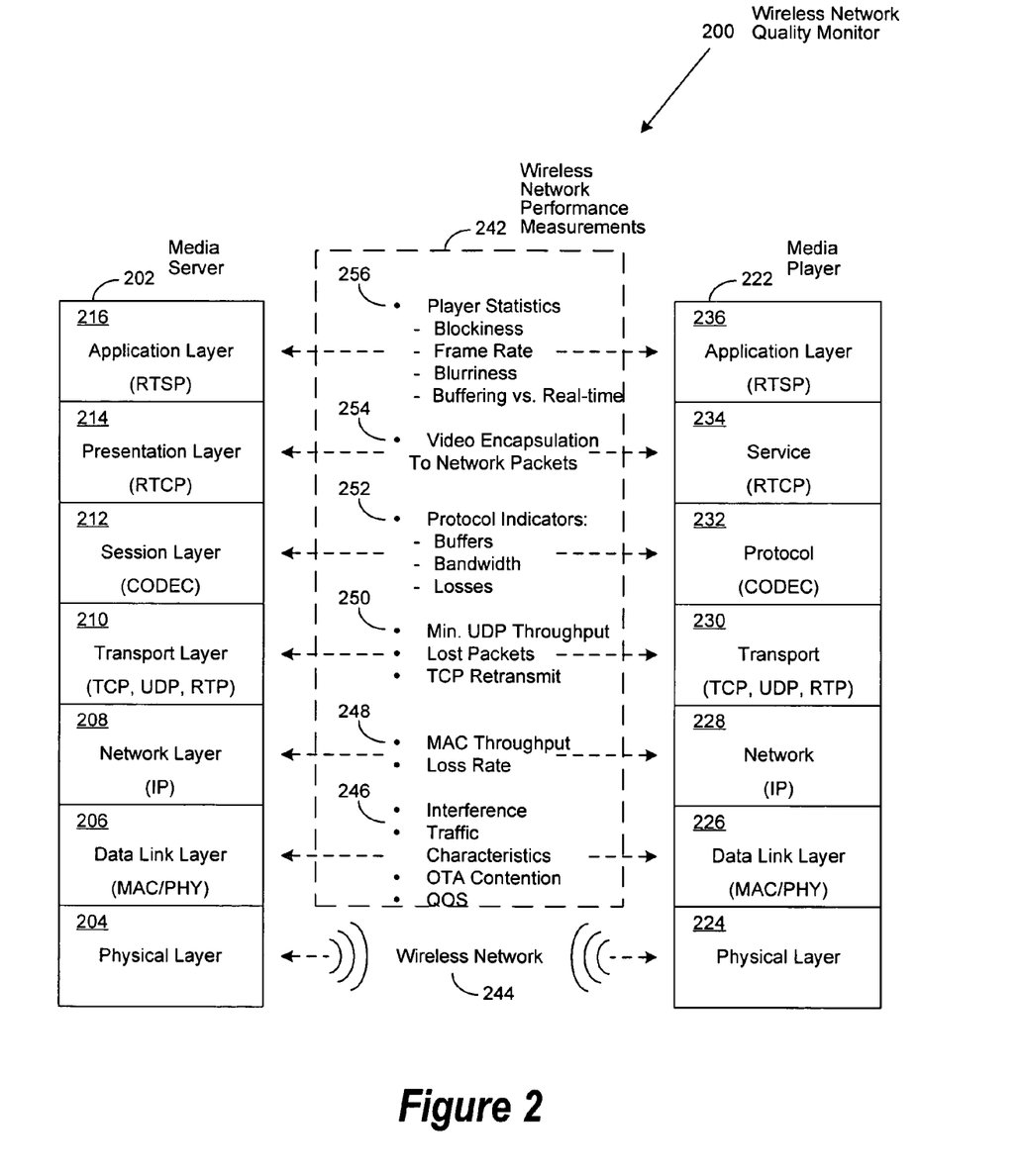
FIG. 2 is a block diagram of a Wireless Network Quality Monitor as implemented in an embodiment of the present invention to measure wireless network performance.

FIG. 2 is a block diagram of a Wireless Network Quality Monitor 200 as implemented in an embodiment of the present invention to measure wireless network performance as it relates to streaming media quality. In an embodiment of the invention, Wireless Network Quality Monitor 200 is broadly comprised of Wireless Network Performance Measurements 242, monitored and collected from Media Server network communications stack 202, and Media Player network communications stack 222, which communicate with each other via wireless network 244. Those of skill in the art will be familiar with network communications stacks such as the Open Systems Interconnect (OSI) model, comprised of seven layers which describe the interaction of various communications protocols coupling components comprising a network.

In one embodiment of the present invention, physical layer 204 of Media Server network communications stack 202, is coupled to physical layer 224 of Media Player network communications stack 222, via wireless network 244. Those of skill in the art will be familiar with the functionality of data link layer 206, 226 of network communications stacks 202 and 222 which typically comprise Media Access Control (MAC) and Physical (PHY) protocol information, which are typically comprised of but not limited to, forwarding rate, signal strength, signal to noise ratio (SNR), contention widow size, packet errors, etc. In the same embodiment of the invention, wireless network performance measurements 246, comprising one or more measurements such as interference, traffic characteristics, over-the-air (OTA) contention, and quality of service (QOS), are collected between data link layer 206 of Media Server network communications stack 202, and data link layer 226 of Media Player network communications stack 222.

Those of skill in the art will also be familiar with the functionality of network layer 206, 226 of network communications stacks 202 and 222, which typically comprise various implementations of the Internet Protocol (IP) which has certain drawbacks such as variable network latency, packets arriving at a destination in a different order from transmission, and packets that may be lost or damaged in transit. In the same embodiment of the invention, wireless network performance measurements 248, comprising one or more measurements such as MAC throughput and loss rate are collected between network layer 208 of Media Server network communications stack 202, and network layer 228 of Media Player network communications stack 222.

Those of skill in the art will likewise be knowledgeable of the functionality of transport layer 206, 226 of network communications stacks 202 and 222, which typically comprise various implementations of Transmission Control Protocol (TCP), User Datagram Protocol (UDP), and Real-Time Protocol (RTP), which was developed for streaming data across IP-based networks. UDP, which is typically used instead of TCP for streaming media transmissions, is a one-way, connectionless protocol requiring no connection to be established prior to transmission.

While UDP provides error detection during transmission, it does not provide error correction, nor does it provide flow control, meaning packets are processed by the media player as they arrive. RTP, which runs on UDP, is used to encapsulate media streams, regardless of their format and content, into RTP packets. These packets are not retransmitted if lost or damaged during transmission, which can affect streaming media performance over wireless networks. In the same embodiment of the invention, wireless network performance measurements 250, comprising one or more measurements such as minimum UDP lost packets and TCP retransmissions are collected between transport layer 210 of Media Server network communications stack 202, and transport layer 230 of Media Player network communications stack 222.

Those of skill in the art will similarly be knowledgeable of the functionality of session layer 212, 232 of network communications stacks 202 and 222, which typically comprise various functions (e.g., Domain Name Service (DNS), Remote Procedure Calls (RPC), etc.) including Compressor-Decompressors (Codecs), which comprise various technologies (e.g., MPEG, etc.) for compressing and decompressing data such as that contained in media streams. In the same embodiment of the invention, wireless network performance measurements 252, comprising one or more protocol indicators such as buffers, bandwidth, and losses, are collected between session layer 212 of Media Server network communications stack 202, and session layer 232 of Media Player network communications stack 222.

Those of skill in the art will be equally knowledgeable of the functionality of presentation layer 214, 234 of network communications stacks 202 and 222, which provides various services to the application layer and typically comprise various functions and protocols including Real-Time Control Protocol (RTCP), which is used for control, diagnostics, and monitoring the Quality Of Service (QOS) of RTP sessions. In the same embodiment of the invention, wireless network performance measurements 254, comprising one or more measurement, such as encapsulation of video data to network packets, are collected between presentation layer 214 of Media Server network communications stack 202, and presentation layer 234 of Media Player network communications stack 222.

Those of skill in the art will be similarly knowledgeable of the functionality of application layer 216, 236 of network communications stacks 202 and 222, which is the layer that most network-aware programs use in order to communicate across a network with other programs. The application layer typically comprises various protocols (e.g., file Transfer Protocol (FTP), Hypertext Transfer Protocol (HTTP), etc.), including Real-Time Streaming Protocol (RTSP), which provides an extensible framework that enables controlled delivery of streaming media. In the same embodiment of the invention, wireless network performance measurements 256, comprising one or more media player statistics, such as blockiness, frame rate, blurriness, and buffering vs. real-time, are collected between application layer 216 of Media Server network communications stack 202, and application layer 236 of Media Player network communications stack 222.

Figure 3:
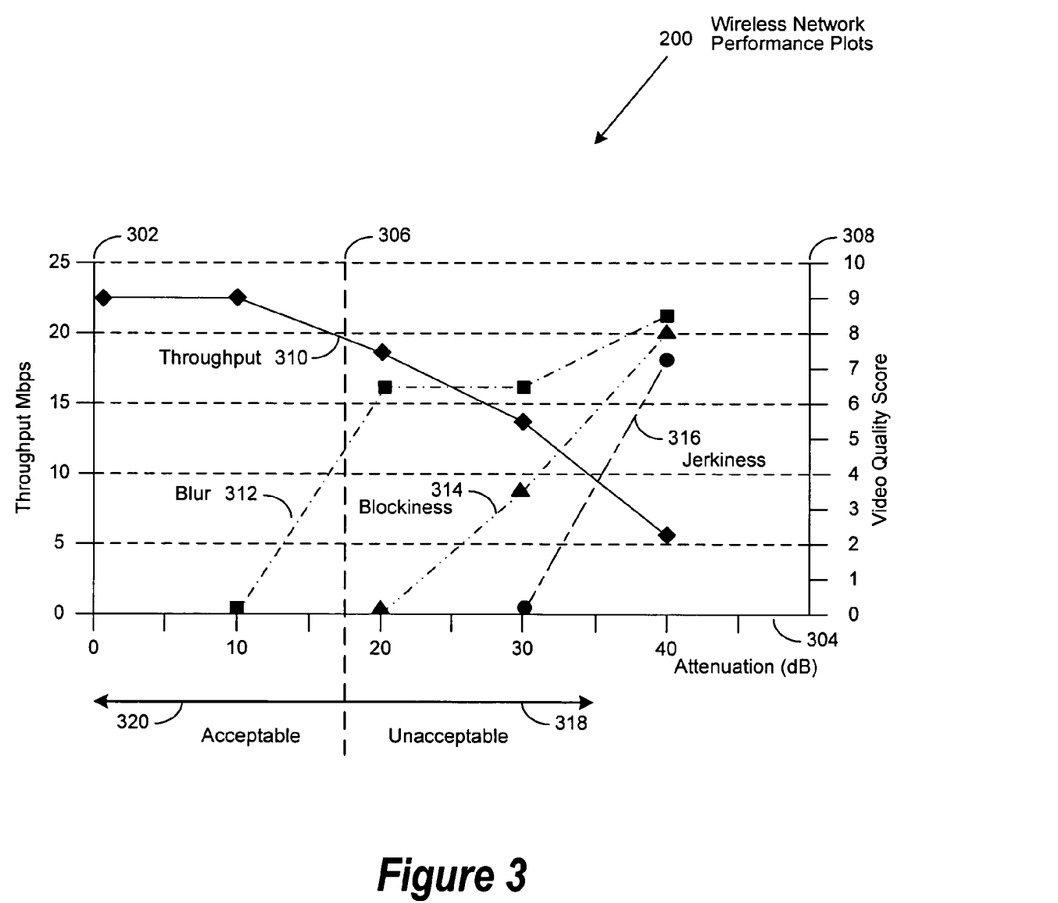
FIG. 3 is a graphical illustration of an embodiment of the present invention as implemented to provide a streaming video quality score comprised of various streaming media quality measurements and a network performance score.

FIG. 3 is a graphical illustration of an embodiment of the present invention as implemented to provide a streaming video quality score 308, comprised of various streaming media quality measurements 312, 314, 316, as a function of wireless network throughput 302 and signal attenuation 304. Note that in this illustration, effective wireless network throughput 310 decreases as wireless signal attenuation 304 increases as a function of range and other factors. In this same illustration, various artifacts affecting streaming video quality such as, but not limited to, blurring 312, blockiness 314, and jerkiness 316, similarly increase as wireless signal attenuation 304 increases and/or wireless effective throughput 310 increases.

In various embodiments of the invention, video artifact measurements 312, 314, 316, along with effective wireless throughput 310 measurements at predetermined signal attenuation levels, can be stored in a database and used as inputs to one or more algorithms to calculate Video Quality Score 308.

For example, the following algorithm:

$$f(\text{Acceptable}) = f(\text{Blur}) * f(\text{Blockiness}) * f(\text{Jerkiness})$$

would determine the effective wireless network throughput that would provide a level of video media stream performance for an acceptable user viewing experience.

In this example, signal attenuation levels greater than maximum signal attenuation level 306, in conjunction with effective wireless network throughput 310 and any resulting video artifacts 312, 314, 316 would result in an unacceptable user viewing experience.

Conversely, signal attenuation levels less than maximum signal attenuation level 306, in conjunction with effective wireless network throughput 310 and any resulting video artifacts 312, 314, 316 would result in an acceptable 320 user viewing experience. It will be apparent to those of skill in the art that many factors can affect streaming media performance in a predetermined wireless network environment, and likewise, it is possible for many such algorithms to be implemented to correspondingly accommodate such factors.

Figure 4:
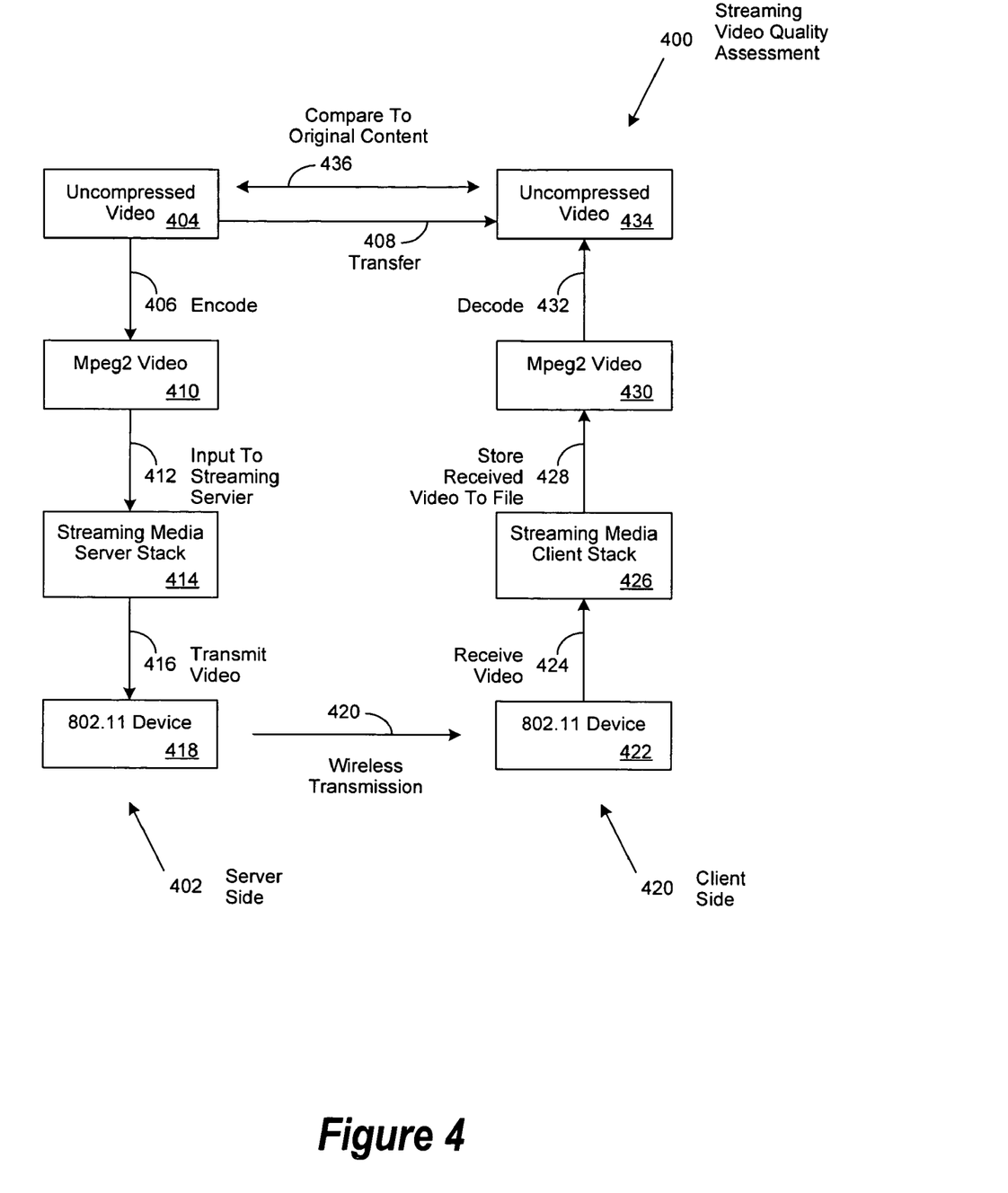
FIG. 4 is a generalized block diagram of a method of an embodiment of the invention used to benchmark wireless streaming media performance as it relates to user viewing experience.

FIG. 4 is a generalized block diagram of a method of an embodiment of the invention used to benchmark wireless streaming media performance, as it relates to user viewing experience, by performing video quality measurements and correlating same to populate a Correlation Database as described in greater detail hereinbelow.

In various embodiments of the invention, benchmark media content is streamed from a server-side 402 media source (e.g., media center PC) to a client-side 420 sink device (e.g., remote laptop or digital media appliance (DMA, etc.) over one or more wireless networks to gauge performance. In one embodiment of the invention, a benchmark workload of uncompressed video content 404, comprised of predetermined media content that is representative of a typical media stream, is encoded 406 at various bit rates into one or more compressed formats (e.g., MPEG2, etc.) 410, at the source. The same benchmark workload of uncompressed video content 404, is also transferred 408 and stored on a client-side 420 sink device, such as a remote laptop or digital media appliance (DMA, etc.). The compressed benchmark workload 410 is then provided as input 412 to streaming media server stack 414, which then transmits 416 the benchmark workload through server-side 402 hardware and network protocols 418 for streaming transmission 420 across a wireless network to client-side target hardware and network protocols 422.

Client-side 420 target hardware and network protocols 422 receives 424 compressed benchmark workload 410 on streaming media client stack 426, and stores 428 received benchmark workload 410 in a compressed format (e.g., MPEG2, etc.) 430. In this embodiment, the benchmark workload, now stored in compressed format 430, is not displayed by a media player client, but is decoded 432, decompressed, and stored as uncompressed video content 434 on a client-side 420 sink device, such as a remote laptop or digital media appliance (DMA, etc.). The uncompressed versions of the benchmark workload 404 from the source and the decoded and decompressed workload 434 stored at the sink are compared to determine and identify any artifacts that were introduced during transmission over the wireless network. A numeric value is then assigned to the comparison reflecting the resulting media quality as viewed by a user at the sink device.

This comparison can then be repeated for content with higher bit rates, allowing the maximum encoding bit rate supported at a specific range to be determined. This comparison can likewise be repeated for a variety of ranges to get a measure of video quality for each range. Network throughput and signal strength can then be correlated to realized media quality and user experience. Skilled practitioners of the art will realize that the method of this embodiment of the invention is not limited by the trans-scaling, trans-rating, transcoding, or transcription of the digital content being streamed. Furthermore, the described method will provide a valid comparison as long as the same encoding/decoding mechanism is used on both sides of the wireless link. Moreover, the described method is equally applicable for implementation on Wireless Local Area Networks (WLANs), Wireless Metropolitan Area Networks (WMANs), Wireless Personal Area Networks (WPANs) and Wireless Wide Area Networks (WWANs) and other wireless network topologies.

Figure 5:
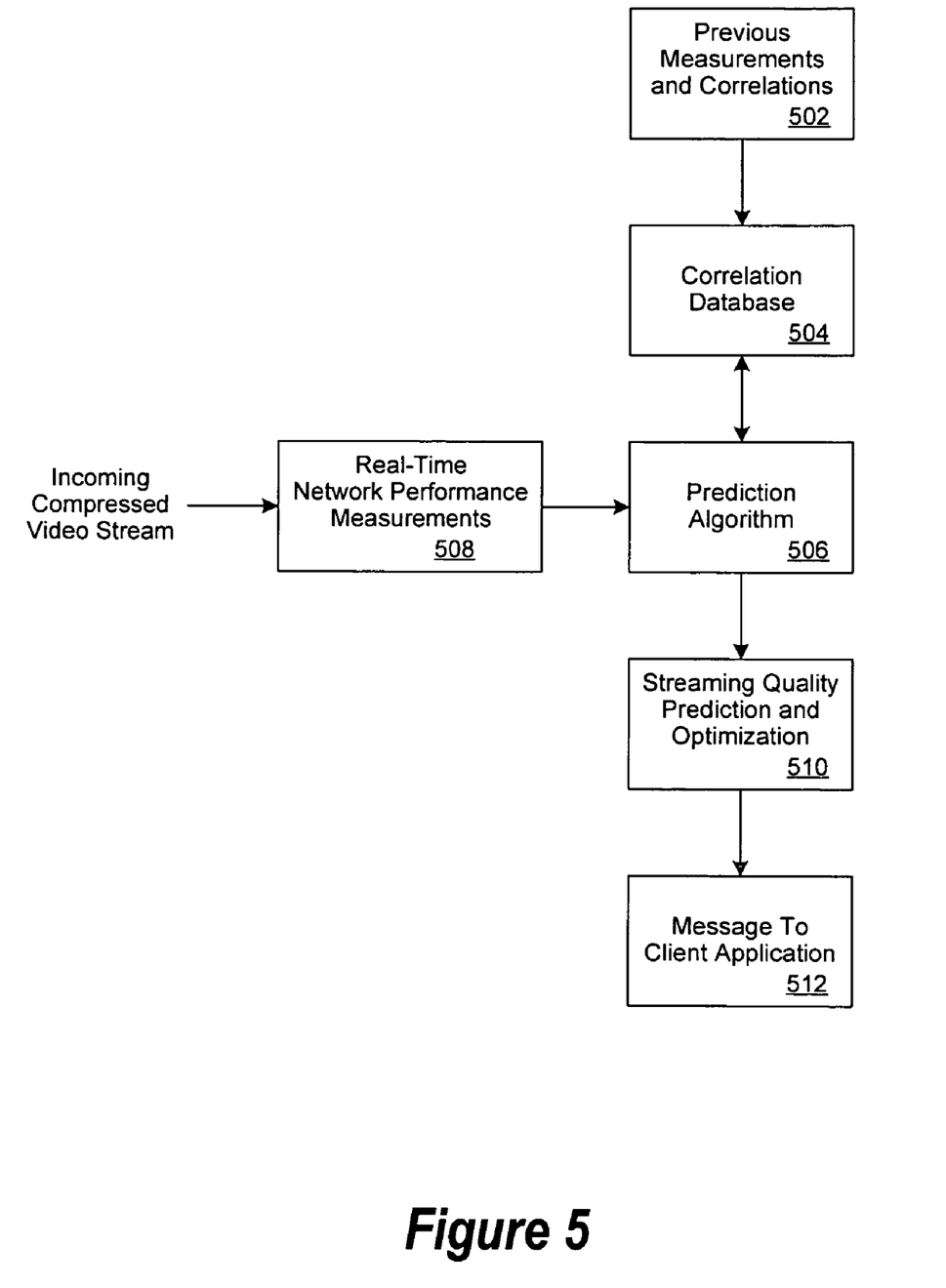
FIG. 5 is a generalized block diagram of an embodiment of the present invention as implemented to predict streaming media performance in a predetermined wireless network environment.

FIG. 5 is a generalized block diagram of an embodiment of the present invention as implemented to predict streaming media performance in a predetermined wireless network environment. In various embodiments of the invention, various wireless network performance parameters are correlated to respective video performance numbers and stored in a Correlation Database as described in greater detail above. The contents of this Correlation Database can serve as a look-up table of streaming video performance for any predetermined network performance parameter threshold specification through the implementation of a streaming media performance prediction algorithm, likewise described in greater detail above.

The streaming media performance threshold specifications are defined such that adequate video performance can be anticipated above a predetermined value of a performance parameter. For example, previously collected measurements and correlations 502 of wireless network access point and streaming media client pairs as described in greater detail above are stored in Correlation Database 504. Real-time measurements 508 are then made of an incoming compressed video stream from a wireless network and applied to Prediction Algorithm 506, which produces streaming quality predictions based on comparisons of real-time network performance measurements to previously collected measurements and correlations 502 retrieved from Correlation Database 504. Streaming quality prediction and optimization function 510 receives the output of Prediction Algorithm 506 such that the resulting predicted streaming media performance is displayed to the user as a message 512 to the streaming media client application. In an embodiment of the invention, streaming quality prediction optimization function 510 performs network optimization operations to improve streaming quality performance and displays resulting in predicted streaming media performance to the user as a message 512 to the streaming media client application.

It will be apparent to those of skill in the art that the method of various embodiments of the invention can be implemented for existing streaming media clients via firmware upgrades or as a software application. Furthermore, the method of various embodiments of the invention can be implemented for wireless devices based on higher speed networking standards such as 802.11n, Ultra Wideband (UWB), and 802.16 (WiMax).

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for predicting streaming media performance over a wireless network, comprising:
   an information handling system comprising processing logic operable to:
   receive and display a media stream transmitted in a compressed format over said wireless network, said information handling system further comprising a streaming media client operable to display said compressed media stream and a network quality monitor client operable to collect corresponding to said compressed media stream;
   process said data corresponding to said compressed media stream to generate a video quality score;
   receive user input data from a user, said user input data corresponding to a comparison of the displayed video quality of said compressed media stream to the video quality of said media stream displayed in an uncompressed format; and
   correlate said video quality score to said user input data to predict the streaming media quality of said wireless network.

2. The system of claim 1, wherein said information handling system is operable to predict said streaming media quality by using a database of predetermined pairs of wireless network environments.

3. The system of claim 2, wherein said information handling system is further operable to predict said streaming media quality by using a benchmark media stream comprising said media stream displayed in an uncompressed format.

4. The system of claim 3, wherein said information handling system is further operable to predict said streaming media quality using network performance metrics.

5. The system of claim 4, wherein said network performance metrics comprise streaming media performance parameters.

6. The system of claim 4, wherein said streaming media performance parameters are used to generate a video quality score.

7. The system of claim 4, wherein said streaming media performance parameters comprise throughput data associated with said media transported over said wireless network.

8. The system of claim 4, wherein said streaming media performance parameters comprise blurriness data associated with said media transported over said wireless network.

9. The system of claim 4, wherein said streaming media performance parameters comprise blockiness data associated with said media transported over said wireless network.

10. The system of claim 4, wherein said streaming media performance parameters comprise jerkiness data associated with said media transported over said wireless network.

11. A method of predicting streaming media performance over a wireless network, comprising:
    using an information handling system comprising processing logic for:
    receiving and displaying a media stream transmitted in a compressed format over said wireless network, said information handling system further comprising a streaming media client operable to display said compressed media stream and a network quality monitor client operable to collect corresponding to said compressed media stream;
    processing said data corresponding to said compressed media stream to generate a video quality score;
    receiving user input data from a user, said user input data corresponding to a comparison of the displayed video quality of said compressed media stream to the video quality of said media stream displayed in an uncompressed format; and
    correlating said video quality score to said user input data to predict the streaming media quality of said wireless network.

12. The method of claim 11, further comprising using said information handling system to predict said streaming media quality by using a database of predetermined pairs of wireless network environments.

13. The method of claim 12, further comprising using said information handling system to predict said streaming media quality by using a benchmark media stream comprising said media stream displayed in an uncompressed format.

14. The method of claim 13, further comprising using said information handling system to predict said streaming media quality using network performance metrics.

15. The method of claim 14, wherein said network performance metrics comprise streaming media performance parameters.

16. The method of claim 14, further comprising using said streaming media performance parameters to generate a video quality score.

17. The method of claim 14, wherein said streaming media performance parameters comprise throughput data associated with said media transported over said wireless network.

18. The method of claim 14, wherein said streaming media performance parameters comprise blurriness data associated with said media transported over said wireless network.

19. The method of claim 14, wherein said streaming media performance parameters comprise blockiness data associated with said media transported over said wireless network.

20. The method of claim 14, wherein said streaming media performance parameters comprise jerkiness data associated with said media transported over said wireless network.

* * * * *

UNITED STATES PATENT AND TRADEMARK OFFICE
CERTIFICATE OF CORRECTION

PATENT NO. : 7,620,716 B2  Page 1 of 1
APPLICATION NO. : 11/344510
DATED : November 17, 2009
INVENTOR(S) : Pirzada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Twenty-sixth Day of October, 2010

David J. Kappos
*Director of the United States Patent and Trademark Office*